(12) United States Patent
Bragagna et al.

(10) Patent No.: US 8,672,702 B2
(45) Date of Patent: Mar. 18, 2014

(54) ELECTRICAL CONDUCTOR ARRANGEMENT AS A COMPONENT OF A PHOTOVOLTAIC ARRAY

(75) Inventors: Elio Bragagna, Duens (AT); Lukas Mundwiler, Gams (CH)

(73) Assignee: Hilti Aktiengesellschaft, Schaan (LI)

( * ) Notice: Subject to any disclaimer, the term of this patent is extended or adjusted under 35 U.S.C. 154(b) by 84 days.

(21) Appl. No.: 13/410,721

(22) Filed: Mar. 2, 2012

(65) Prior Publication Data

US 2012/0255597 A1  Oct. 11, 2012

(30) Foreign Application Priority Data

Mar. 4, 2011  (EP) ..................... 11156913

(51) Int. Cl.
*H01R 4/24* (2006.01)
*H01R 4/26* (2006.01)
*H01R 11/20* (2006.01)

(52) U.S. Cl.
USPC .......................................... 439/415; 136/251

(58) Field of Classification Search
USPC ................. 439/415, 412, 416, 417, 418, 431; 248/237; 174/84 R
See application file for complete search history.

(56) References Cited

U.S. PATENT DOCUMENTS

| | | | | |
|---|---|---|---|---|
| 3,864,009 A * | 2/1975 | Wickenberg | ................... | 439/415 |
| 4,541,680 A * | 9/1985 | Johnston | ........................ | 439/415 |
| 6,050,844 A * | 4/2000 | Johnson | ........................ | 439/415 |
| 6,786,012 B2 * | 9/2004 | Bradley, Jr. | ................... | 52/173.3 |
| 6,968,654 B2 * | 11/2005 | Moulder et al. | .............. | 52/173.3 |
| 8,251,326 B2 * | 8/2012 | McPheeters | ............... | 248/228.2 |
| 8,316,592 B2 * | 11/2012 | Lanza | ........................... | 52/173.3 |
| 2006/0266405 A1 * | 11/2006 | Lenox | ............................ | 136/244 |
| 2007/0248434 A1 | 10/2007 | Wiley et al. | | |
| 2010/0282920 A1 * | 11/2010 | McPheeters | .................... | 248/72 |
| 2010/0284737 A1 * | 11/2010 | McPheeters | ............... | 403/374.3 |
| 2011/0278411 A1 * | 11/2011 | Carbonare et al. | ............ | 248/237 |
| 2012/0273029 A1 * | 11/2012 | Bragagna et al. | ............. | 136/251 |

FOREIGN PATENT DOCUMENTS

DE  102007027497 A1  2/2008

* cited by examiner

*Primary Examiner* — Hae Moon Hyeon
(74) *Attorney, Agent, or Firm* — McAndrews, Held & Malloy, Ltd.

(57) ABSTRACT

An electrical conductor arrangement, particularly as a component of a photovoltaic array. Such an arrangement is designed having a first electrically conductive element, a second electrically conductive element, and an electrically conductive rod which itself has a threading, wherein the two elements are in electrical contact with each other via said rod.

12 Claims, 1 Drawing Sheet

ELECTRICAL CONDUCTOR ARRANGEMENT AS A COMPONENT OF A PHOTOVOLTAIC ARRAY

CROSS-REFERENCE TO RELATED APPLICATIONS

The present application claims priority to European Patent Application EP11156913, filed Mar. 4, 2011, and entitled "Elektrische Leiteranordung, Insbesondere als Bestandteil einer Photovoltaikanlage" ("Electrical Conductor Arrangement, Particularly As A Component Of A Photovoltaic Array"), which is hereby incorporated by reference in its entirety.

BACKGROUND OF THE INVENTION

The present invention generally relates to an electrical conductor arrangement, particularly as a component of a photovoltaic array.

During the operation of a photovoltaic array, circumstances may arise where an undesired electrical charge is created in the outer frame of the photovoltaic modules. Such a charge may be due to, by way of example, fault currents from the solar cells triggered by moisture, or atmospheric effects. Because electrical charge may in some cases lead to arcing, thereby posing a potential hazard to persons and equipment, the outer frames of photovoltaic modules are frequently grounded.

A possible approach to grounding the system may be an electrically conductive connection between each module frame and the associated substructure thereof. Such a connection may be realized using cables which are attached on one end thereof to each module frame, and which are attached to the substructure on the other end thereof, using bolts. In this way, the module frames may be connected to each other and to the substructure. The attachment of the so-called ground cable, however, may involve a comparatively large amount of work.

A further possible approach to grounding the system is the use of contact plates, wherein the same have a contact surface which is structured in such a manner that it automatically cuts through the coating of the photovoltaic module frame and the substructure thereof when the module clamps of the photovoltaic module are tightened down.

An arrangement for creating an electrically conductive connection between two elements, for the motor vehicle field, is known from DE 10 2007 027 497 A1. DE 10 2007 027 497 A1 teaches the provision of an opening in each of the elements, arranging the two openings in a flush position with each other, and positioning a bolt through the two openings. In this case, the configuration not only creates an electrically conductive connection using the bolts, but also both openings are fixed in a flush position at the same time.

US2007248434A teaches the positioning of a bolt through two flush recesses in neighboring elements for the purpose of creating an electrically conductive connection on a photovoltaic array, wherein the neighboring elements in the case of US2007248434A are electrically connected to each other via a toothed disk which surrounds the bolts.

BRIEF SUMMARY OF THE INVENTION

One or more embodiments of the present invention provides an electrical conductor arrangement, particularly as a component of a photovoltaic array. Such an arrangement is designed having a first electrically conductive element, a second electrically conductive element, and an electrically conductive rod which itself has a threading, wherein the two elements are in electrical contact with each other via said rod.

BRIEF DESCRIPTION OF THE DRAWINGS

One or more embodiments of the invention is described in greater detail below with reference to preferred embodiments which are illustrated schematically in the attached figures, wherein.

DETAILED DESCRIPTION OF THE INVENTION

Figure 1:
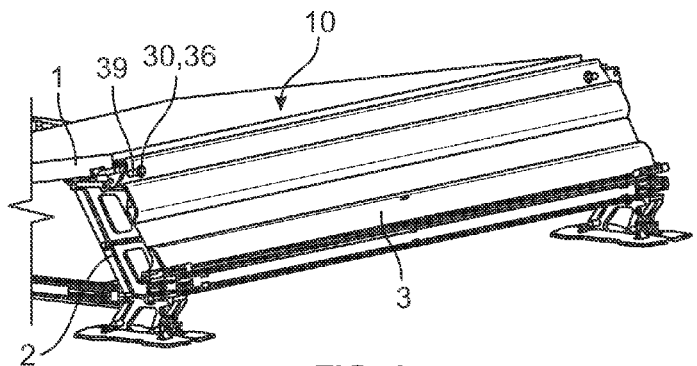
FIG. 1 shows a perspective view of a photovoltaic array having an embodiment of an electrical conductor arrangement.
Figure 2:
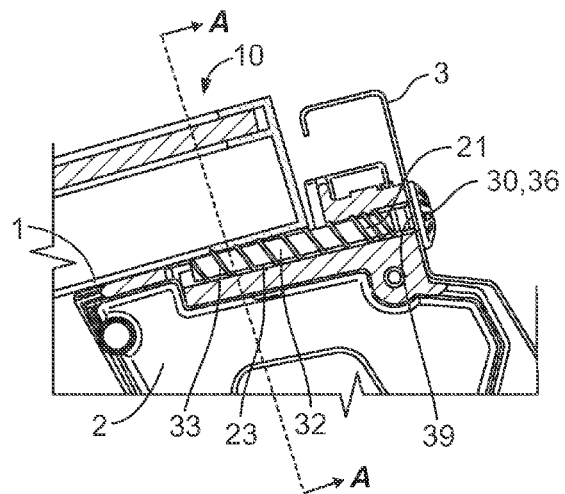
FIG. 2 shows a detailed view of the conductor arrangement in FIG. 1, in a cutaway view along the threaded rod.

One or more embodiments of the present invention create an electrical conductor arrangement which may be deployed in particularly many ways, and which is also cost-effective, easy to install, and reliable.

According to one or more embodiments of the invention, the problem is addressed by an arrangement having the features of claim 1. Preferred embodiments are given in the dependent claims.

A conductor arrangement according to one or more embodiments of the invention is characterized in that the rod is at least partially embedded between the two conductive elements.

A basic premise of one or more embodiments of the invention may be considered that of routing the threaded rod, at least in sections, said rod being provided for the purpose of creating the electrical connection between the two elements, along the two element surfaces which face each other, such that the threaded rod runs at least sectionally between the two elements.

In contrast to an arrangement having a ground cable which is fixed by a bolt, installation of the arrangement according to one or more embodiments of the invention does not require that two openings be positioned flush with each other. In this way, according to one or more embodiments of the invention, the installation is particularly simple and fast. Also, according to one or more embodiments of the invention, the configuration which produces the electrical connection may also be integrated into the installation process for the two elements in a particularly simple manner. Because the embedded positioning according to one or more embodiments of the invention may be executed using geometrically simple components, the configuration may also be constructed in a particularly cost-effective manner. In addition, according to one or more embodiments of the invention, it is possible, using a particularly simple visual check, and particularly using checking whether the bolt is present, to check whether an electrical connection, particularly a ground connection, is established. Moreover, the embedded positioning according to one or more embodiments of the invention makes it possible to provide particularly large electrical contact surfaces between the rod and the adjacent elements, thereby providing a particularly reliable connection. In contrast to arrangements according to the prior art, wherein the grounding bolt holds two openings of the two connection elements in a flush position, the embedded positioning of the threaded rod according to one or more embodiments of the invention makes it possible to separate the electrical connection of the two elements from the mechanical connection of the two elements to a certain degree, and this increases the degree of freedom in designing and constructing the components, thereby opening up a particularly multi-faceted spectrum of possible uses.

The embedded arrangement of the rod according to one or more embodiments of the invention may particularly include a configuration wherein the rod extends at least sectionally along both elements, said extension being viewed in the longitudinal dimension of the rod, and wherein the rod is also in contact with both elements, and/or wherein the rod has at least one cylindrical contact region on the outer surface of the rod, wherein the rod is in contact via this region with both elements. One or more embodiments of the invention may also include a configuration wherein at least one of the elements only surrounds the rod incompletely, meaning not in a ring, and is particularly only tangent to the rod. For example, if the first element is the frame of a solar module, the same need not be specifically modified to have an opening for the rod. Rather, the frame may abut the rod via a flat side of the frame.

For the purpose of creating particularly high mechanical stability, by way of example, in one configuration the first element may have a flat surface region in the area near the bolt, wherein this region faces the second element. The first element may rest on the second element via this surface region, particularly prior to the installation of the rod. The embedded arrangement of the rod according to one or more embodiments of the invention may include a configuration wherein the longitudinal axis of the rod runs at least approximately parallel to this flat surface region, having an angle thereto of less than 30°, and particularly less than 10°, 5°, or 1°. The second element may be designed in an analogous manner.

In a particularly preferred embodiment of the invention, at least the second element has a guide bore through which the rod is passed. In this way, the configuration may ensure a particularly reliable positioning of the rod during installation, particularly at the start of the procedure wherein the rod is screwed in between the two elements.

In the simplest case of an embedded arrangement of the threaded rod according to one or more embodiments of the invention, both elements may be designed with a flat profile in the region of the rod. However, a configuration is particularly preferred wherein at least the second element has a groove in which the rod is routed, wherein said groove is at least sectionally shaped like a half-cylinder. In this way, it is possible to improve the reliability of the positioning, and it is possible to prevent the rod from coming out of alignment toward the outside of the arrangement when the rod is screwed in between the elements. In addition, the electrical contact surface between the rod and the second element may be enlarged using a groove. If the second element has such a groove, the first element may be designed with a flat profile in the region of the rod. This involves particularly low costs for manufacture. In the event that the first element is the frame of a solar module, the same need not be modified for use in the arrangement according to one or more embodiments of the invention.

It is particularly advantageous that the rod is passed through a third element which is particularly electrically conductive, particularly a wind deflector. According to this embodiment, the rod may also be used in a particularly simple manner to fix and/or establish an electrical contact to the third element, such that both costs and installation time may be reduced.

In a further preferred implementation of the invention, the rod has a bolt head. According to this embodiment, the conductor arrangement has a bolt with a shaft, wherein the rod is formed by said shaft. The bolt head may serve to engage with a screwdriver tool. In addition, using the bolt head, the third element may be fixed to the first element and/or to the second element, and an electrical connection may be established between the rod and the third element.

As such, it is particularly preferred that the bolt head fixes the third element in a positive-fitting manner. The bolt head may be seated directly on the third conductive element for this purpose, or may be seated on the same via a conductive annular disk.

To produce a particularly good contact and/or particularly good mechanical strength, in one configuration the first element and/or the second element may have a negative shape corresponding to the positive shape of the threading, wherein the threading is partially received in this negative shape counterpart. In addition, it is possible to realize a positive-fit connection between the elements and the rod. In principle, the negative shape may be included during the manufacture of the first and/or the second element. However, it is particularly preferred that the threading of the rod is self-cutting, such that the negative shape is furrowed into the element when the rod is screwed in. In a further configuration, the negative shape may be created when the first element is pressed together with the second element, for example using module clamps, wherein the rod is placed between the two elements.

It is particularly preferred that the first element and/or the second element have aluminum at least in the region of the rod, and that the rod have a zinc-nickel coating. The bolt may particularly have steel in the core thereof. Surprisingly, it has been demonstrated that such a combination of materials both makes it possible to obtain a particularly simple and simultaneously stable arrangement, wherein this is advantageous with respect to the installation, and also to obtain a particularly high resistance to corrosion, which is advantageous with respect to outdoor uses of one or more embodiments of the invention. For example, in one configuration, the second element may be made of an aluminum die cast alloy, at least in the region of the rod. It has been demonstrated that such material enables a threaded rod made of steel to furrow into the material in a self-cutting manner, such that it is not necessary to provide a complementary negative counterpart for the threading in advance, and this is particularly cost-effective. The rod may particularly be produced from steel, preferably a carbon steel, coated with a zinc-nickel alloy, and/or sealed with a lubricant.

One or more embodiments of the invention also relates to a solar array, particularly a photovoltaic array, having an electrical conductor arrangement according to one or more embodiments of the invention, wherein the first element is a frame of a solar module, particularly a photovoltaic module, and the second element is a substructure of the solar module. The optional third element may be a wind deflector which is functionally assigned to the solar module.

One or more embodiments of the invention also relates to a method for the installation of an arrangement according to one or more embodiments of the invention, wherein both elements are initially attached to each other using at least one module clamp, and then the rod is screwed in between the elements. Because the electrical contact surfaces are produced in this case when the rod is screwed in, in this embodiment it is possible to further increase the reliability of the contact in some circumstances. During the process wherein the rod is screwed in, the threading thereof may penetrate into one or both elements by displacing material during a rotary movement.

In addition, one or more embodiments of the invention also relates to a method for the installation of the arrangement according to one or more embodiments of the invention, wherein the rod is initially arranged on the second element, particularly in a groove provided in the second element, and then both elements are attached to each other using at least one module clamp. During the process wherein the elements are clamped, the rod threading may penetrate into one or both elements by displacing material during the tightening of the module clamp—that is, during a linear movement. In this variant, the rod could also be pre-installed, wherein this may reduce the complexity of the installation at the construction site.

The method for installation according to one or more embodiments of the invention may, by way of example, be used during the installation of a solar array according to one or more embodiments of the invention.

One or more embodiments of the invention relates to an electrical conductor arrangement, particularly as a component of a photovoltaic array. Such an arrangement is designed having a first electrically conductive element, a second electrically conductive element, and an electrically conductive rod which itself has a threading, wherein the two elements are in electrical contact with each other via said rod.

Figure 3:
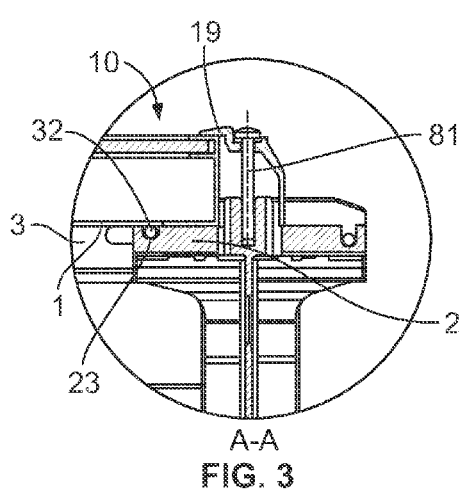
FIG. 3 shows a detailed view of the conductor arrangement in FIG. 1, in a cross-section view along the cut A-A in FIG. 2.

An embodiment of a photovoltaic array according to the invention, having an electrical conductor arrangement, is illustrated in the figures. The photovoltaic array has a solar module 10. This solar module 10 has a frame which forms a first electrically conductive element 1. The photovoltaic array also has a substructure which forms a second electrically conductive element 2. The second element 2, meaning the substructure, supports the solar module 10 in such a manner that the solar module 10 is oriented with an inclination to the horizontal. The photovoltaic array also has a wind deflector which forms a third electrically conductive element 3. The third element 3, designed as a wind deflector, includes a metal sheet which is tilted with respect to the horizontal, is arranged adjacent to an upper edge of the solar module 10, and partially closes the access to a space underneath the solar module 10. Module clamps 19 may be provided for the purpose of fixing the solar module 10, with the first conductive element 1, to the second element 2, which is designed as the substructure. These module clamps 19 are only shown in FIG. 3 for the purpose of visual clarity. These module clamps 19 press the solar module 10 onto the second element 2. The module clamps 19 each have a bolt 81, wherein the negative counter threading corresponding to the bolt 81 is provided in the second element 2.

For the purpose of establishing an electrical connection between the first element 1, designed as a frame, and the second element 2 which forms the substructure, to create a ground, the embodiment includes at least one metal bolt 30 having a bolt head 36, and one rod 32 having a threading 33, wherein said rod 32 forms the shaft of the bolt 30. This bolt 30 is screwed into the second element 2. The rod 32 passes through a guide bore 21 in the second element 2 in the region of the bolt head 36. In the region of its free end, the rod runs through a groove 23 which is formed in the second element 2. In this case, the rod 32 is oriented along the underside of the first element 1 in the region of the groove 23, and at least the threading 33 thereof projects beyond the edge of the groove 23, such that the threading 33 may cut into the first element 1 with the result that a non-conducting cover layer on the first element 1 is perforated, and an electrical contact between the rod 32 and the first element 1 is produced. The threading 33 also cuts into the second element 2, particularly in the region of the groove 23.

The rod 32 is consequently embedded between the first element 1 and the second element 2 in the region of the groove 23, meaning particularly that the rod has a cylindrical segment which abuts both the first element 1 and also the second element 2. The module clamp 19 presses the first element 1 onto the second element 2, and at the same time presses the rod 32 between both elements 1 and 2.

The third element 3, designed as a wind deflector, has an opening 39 through which the rod 32 is passed, wherein the bolt head 36 is seated on the third element 3, and the third element is secured on the second element 2 in a positive-fitting manner. The bolt may therefore also electrically connect the third element 3 to the second element 2.

During the installation of the arrangement as illustrated, the first element 1 may initially be secured to the second element 2 using the module clamp 19. Then the bolt 30 may be screwed into the second element 2. The threading 33 which projects beyond the contact surface in the second element 2 for the solar module 10 in the region of the groove 23 may furrow through an electrical insulating layer of the first element 1 during the screwing process, and in this way create an electrically conductive connection between the first element 1 and the second element 2. The depth of the cut furrows may be determined by the positioning of the bolt 30 relative to the solar module 10.

As an alternative, the bolt 30 may be mounted on the second element 2 first, followed by the first element 1. In this case, the threading 33 is forced through the electrically insulating layer into the aluminum of the first element 1 using the clamping force of the module clamp 19, and in this way creates the electrically conductive connection. As such, the ground function may be ensured using one or more embodiments of the invention regardless of the installation sequence.

While particular elements, embodiments, and applications of the present invention have been shown and described, it is understood that the invention is not limited thereto because modifications may be made by those skilled in the art, particularly in light of the foregoing teaching. It is therefore contemplated by the appended claims to cover such modifications and incorporate those features which come within the spirit and scope of the invention.

The invention claimed is:

1. A photogalvanic array comprising:
   an electrically conductive rod which has a threaded portion;
   a solar module having a frame which forms a first electrically conductive element;
   a substructure configured to support the solar module, the substructure comprising a second electrically conductive element, wherein at least one of the first and second electrically conductive elements defines a groove configured to receive the electrically conductive rod such that the first and second electrically conductive elements are in electrical contact with each other through said rod; and
   wherein the threaded portion of the rod is embedded at least partially into at least one of the first and second electrically conductive elements in the area of said groove.

2. The photogalvanic array as set forth in claim 1, wherein the groove is formed in the second electrically conductive element at a location adjacent the first electrically conductive element.

3. The photogalvanic array as set forth in claim 1, wherein the array is assembled by screwing the rod into the groove such that the threaded portion of the rod furrows into at least one of the first and second electrically conductive elements to form electrical contact therewith.

4. The photogalvanic array as set forth in claim 1, further comprising a module clamp configured to secure the solar module to the substructure, the module clamp exerting a clamping force that compresses the threaded portion of the rod between the first and second electrically conductive elements in the area of the groove.

5. The photogalvanic array as set forth in claim 1, further including a bore adjacent the groove, the bore being configured to receive the rod and direct the rod into the groove.

6. The photogalvanic array as set forth in claim 1, further comprising a wind deflector arranged adjacent an upper edge of the solar module, the wind deflector comprising a third electrically conductive element which defines a passage for receiving the rod, and wherein the rod passes through the third electrically conductive element, such that the first, second and third electrically conductive elements are in electrical contact with each other through said rod.

7. The photogalvanic array as set forth in claim 5, wherein said rod includes a bolt head.

8. The photogalvanic array as set forth in claim 7, wherein said bolt head fixes the wind deflector to the solar module with a positive-fit connection.

9. The photogalvanic array as set forth in claim 1, wherein at least one of said first conductive element and said second conductive element comprises aluminum, at least in the region of the rod.

10. The photogalvanic array as set forth in claim 1, wherein said rod has a zinc-nickel coating.

11. A method for assembling a photogalvanic array comprising a solar module with a frame and a substructure configured to support the solar module, the solar module comprising a frame which forms a first electrically conductive element, the substructure comprising a second electrically conductive element, the method comprising:
    attaching the first and second electrically conductive elements to each other using at least one module clamp; and
    screwing an electrically conductive rod which has a threading in between said first and second conductive elements, wherein both said first conductive element and said second conductive element are in electrical contact with each other through said rod; and
    wherein said rod is embedded at least partially between both said first conductive element and said second conductive element.

12. A method for assembling a photogalvanic array comprising a solar module with a frame and a substructure configured to support the solar module, the solar module comprising a frame which forms a first electrically conductive element, the substructure comprising a second electrically conductive element, the method comprising:
    positioning an electrically conductive rod which has a threading between said first and second electrically conductive elements;
    thereafter clamping the first and second electrically conductive elements to each other using at least one module clamp, the module clamp exerting a clamping force that compresses the threaded portion of electrically conductive rod between the first and second electrically conductive elements such that the first and second electrically conductive elements are in electrical contact with each other through said rod.

* * * * *